United States Patent [19]

Christiansen

[11] 4,000,651
[45] Jan. 4, 1977

[54] LIQUID LEVEL INDICATOR
[75] Inventor: Frank Christiansen, Oslo, Norway
[73] Assignee: Norapp A/S, Oslo, Norway
[22] Filed: Jan. 15, 1976
[21] Appl. No.: 649,353
[30] Foreign Application Priority Data
  Jan. 20, 1975 Norway ................. 165/75
[52] U.S. Cl. .................... 73/314; 73/DIG. 5
[51] Int. Cl.² ........................... G01F 23/12
[58] Field of Search ......... 73/314, 321, 305, 322.5, 73/313, DIG. 5; 33/126

[56] References Cited
UNITED STATES PATENTS

| | | | |
|---|---|---|---|
| 2,592,929 | 4/1952 | Matchett | 73/313 |
| 3,433,073 | 3/1969 | Kunert | 73/313 |
| 3,555,905 | 1/1971 | George | 73/321 |

Primary Examiner—Donald O. Woodiel
Assistant Examiner—Joseph W. Roskos
Attorney, Agent, or Firm—Young & Thompson

[57] ABSTRACT

A liquid level indicator with a magnetic acting float which is movable along the exterior of a ribbed tube which extends substantially vertically in the liquid container. Within the tube is movable up and down a sensor which reacts magnetically on the float and thereby controls the direction of rotation of an electric motor which via a gear wheel and a longitudinally perforated metal band which is coated with insulating material and acts as one electric conductor, and the tube acts as the second electric conductor from the sensor via a gliding contact.

4 Claims, 5 Drawing Figures

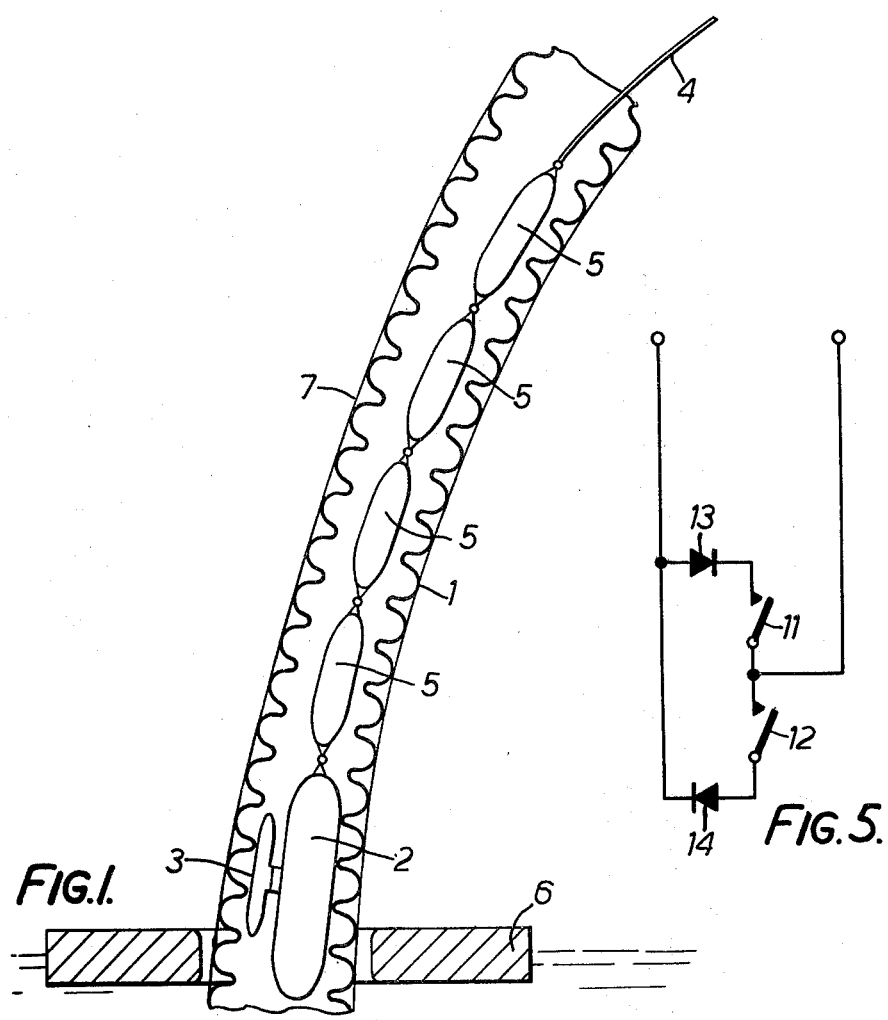
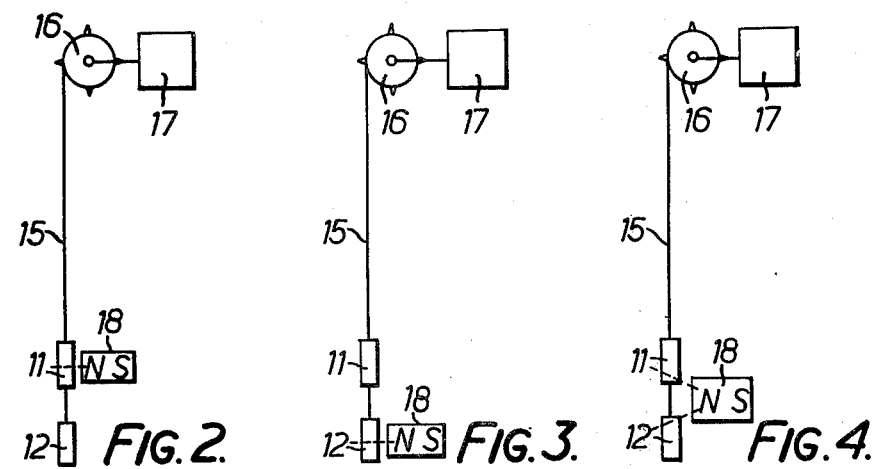

LIQUID LEVEL INDICATOR

The present invention relates to a liquid level indicator which comprises a float which is movable along the exterior of a tube which extends substantially vertically in the liquid container, and within which tube is movable up and down a sensor which reacts magnetically on the float and thereby controls the direction of rotation of an electric motor exterior the liquid container, for moving the sensor by means of a rigid flexible metal band which is perforated in the longitudinal direction and coated with an electrically insulating material and acts as one electric conductor between the sensor and the control means for the motor.

By liquid level indicators of this type a rigid straight metal tube is used which extends from top to bottom in the liquid container. It may be that it is desirable to insert the tube from the side near the top of the container, so that it extends in a slight curve in the upper part of the container and then enters a part of the tube which extends substantially vertically. Further if the tube itself is used as an electric conductor which keeps contact with the sensor by means of a sliding contact, it is difficult to obtain a continuous and level contact resistance.

The main object of the invention therefore is to make it possible to give the tube a curved path and to increase the reliability of the contact resistance with the tube wall.

This is according to the invention achieved in that the tube is a flexible metal tube with a bellowslike wall, the interior side of which by means of a sliding contact on the sensor, acts as the second electrical conductor between the sensor and the control means. As a result of the undulated interior surface of the tube wall the sliding contact and the tops of the undulation of the tube wall are kept clean by the movement of the sensor up and down through the tube.

To facilitate the straightening of the metal band a weight is attached between the band and the sensor. As the tube has relatively small diameter, the weight is realized as a number of articulated, thin metal cylinders. In this way the weight may pass curved parts of the tube without difficulty.

With advantage the tube may exteriorly be coated with a flexible hose of metal or plastic.

Preferably the sensor contains two in the direction of movement of the sensor spaced magnetically affectible contacts, of which each is connected in series to one of two diodes of opposite polarity, which series connections are connected in parallel in the motor circuit which further contains the two electric conductors between the sensor and the motor.

The invention are further described hereinbelow with reference to the drawing.

FIG. 1 shows an axial section through a part of a liquid level indicator according to the invention.

FIGS. 2 to 4 show diagrammatically a liquid level indicator according to the invention with the float in three different positions.

FIG. 5 shows the circuit diagram of the sensor in FIGS. 2–4.

FIG. 1 shows a flexible ribbed tube 1 of metal with an exterior flexible hose 7 of metal or plastic, which extends down into a not shown liquid container of which the liquid level is to be indicated. In the tube a magnetically affected sensor 2 is movable with a part of its exterior surface against the interior ribs of the tube and with a gliding contact 3 in contact with the ribs on the opposite tube wall. The gliding contact has resilient bearing against the ribs and by the movement of the sensor 2 is a selfcleaning effect obtained of the contact surfaces as a result of their unevenness. The tube itself acts as one electric conductor from the sensor to a not shown control means for operation of an electric motor which via a gear wheel moves a longitudinally perforated, rigid and flexible steel band 4 which is coated with a layer of electric insulating material and acts as the other electric conductor from the sensor 2 to the control means. The sensor is affected by a float 6 which surrounds the tube 1, floats on the liquid surface and is magnetic. As the resilient bearing may result in a bending of the band 4, a weight comprising four articulated metal cylinders 5 is connected between the sensor and the band and the cylinders have together a weight which overpower the resilient effect of the gliding contact and thereby keep the band stretched by movement as well upwards as downwards. The sensor 2 as well as the metal cylinders 5 have rounded ends to prevent that they are hooked up in the tube ribs.

To prevent that the float 6 is hooked up in exterior tube ribs, it is coated with a flexible hose 7 of metal or plastic.

In FIGS. 2 to 4 the sensor comprises two reed relays 11 and 12 which are arranged spaced on a perforated band 15 which runs over a gear wheel 16 which is driven by a direct current motor 17 in opposite directions according to the direction of the current. The perforations in the band 15 are adapted to the teeth on the gear wheel 16. The band 15 may have two electric conductors in the form of conductive stripes arranged directly on band of plastic or on an insulating layer on a steel band. In connection with the gear wheel are arranged gliding contacts which cooperate with the conducting stripes which are connected to the circuit in FIG. 5. The two reed relays 11 and 12 are connected in series with each one of two diodes 13 and 14 with opposite polarity, and the series connections are connected in parallel between the conductors.

The motor circuit contains in series the sensor in FIG. 5, and the motor 17 is connected directly to a current source, so that when the relay 11 is affected by the magnetic field of the float as shown in FIG. 2, the motor 17 is rotated in a direction which lifts the sensor. When the relay 12 is affected by the magnetic field of the float as shown in FIG. 3, the motor is rotated in the opposite direction which lower the sensor. In an intermediate position of the magnetic field between the two relays both the relays are affected simultaneously as shown in FIG. 4 and may be used to stop the motor by means of known and not shown means.

Having described my invention, I claim:

1. Liquid level indicator which comprises a float which is movable along the exterior of a tube which extends substantially vertically in the liquid container, and within which tube is movable up and down a sensor which reacts magnetically on the float and thereby controls the direction of rotation of an electric motor exterior the liquid container, for moving the sensor by means of a rigid flexible metal band which is perforated in the longitudinal direction and coated with an electrically insulating material and acts as one electric conductor between the sensor and the control means for the motor, characterized in that the tube is a flexible metal tube with a bellowslike wall the interior side of which by means of a sliding contact on the sensor, acts as the second electric conductor between the sensor and the control means.

2. Liquid level indicator according to claim 1, characterized in that between the band and the sensor is attached a weight comprising a number of articulated, thin metal cylinders.

3. Liquid level indicator according to claim 1, characterized in that the tube exteriorly is coated with a flexible hose of metal or plastic.

4. Liquid level indicator according to claim 1, characterized in that the sensor contains two spaced magnetically affectible contacts in the direction of the movement of the sensor, of which each is connected in series to one of two diodes of opposite polarity, which series connections are connected in parallel in the motor circuit which further contains the two electric conductors between the sensor and the motor.

* * * * *